United States Patent
Giannatti

(10) Patent No.: US 9,797,422 B2
(45) Date of Patent: Oct. 24, 2017

(54) SHEET MATERIAL CLAMP

(71) Applicant: WINSTON PRODUCTS, LLC, Cleveland, OH (US)

(72) Inventor: Nicholas D. Giannatti, Hudson, OH (US)

(73) Assignee: WINSTON PRODUCTS, LLC, Cleveland, OH (US)

( * ) Notice: Subject to any disclaimer, the term of this patent is extended or adjusted under 35 U.S.C. 154(b) by 6 days.

(21) Appl. No.: 14/982,958

(22) Filed: Dec. 29, 2015

(65) Prior Publication Data

US 2017/0184140 A1 Jun. 29, 2017

(51) Int. Cl.
| F16B 2/10 | (2006.01) |
| E05D 7/10 | (2006.01) |
| F16B 2/00 | (2006.01) |
| F16B 2/18 | (2006.01) |
| B60P 7/02 | (2006.01) |

(52) U.S. Cl.
CPC .............. F16B 2/10 (2013.01); B60P 7/02 (2013.01); E05D 7/1077 (2013.01); F16B 2/005 (2013.01); F16B 2/18 (2013.01); E05Y 2900/60 (2013.01); Y10T 24/44538 (2015.01)

(58) Field of Classification Search
CPC .... F16B 2/10; F16B 2/18; F16B 2/005; E05D 7/1077; B60P 7/02; E05Y 2900/60
See application file for complete search history.

(56) References Cited

U.S. PATENT DOCUMENTS

| 3,604,071 | A | * | 9/1971 | Reimels | A61B 17/30 24/543 |
| 3,698,043 | A | * | 10/1972 | Batts | A44B 99/00 223/87 |
| D234,204 | S | * | 1/1975 | Miller | 24/487 |
| 3,972,333 | A | * | 8/1976 | Leveen | A61B 17/30 30/234 |
| 3,982,307 | A | * | 9/1976 | Smith | A44B 99/00 24/543 |
| 4,012,811 | A | * | 3/1977 | Mazzaferro | D06F 55/00 223/91 |
| 4,390,019 | A | * | 6/1983 | LeVeen | A61B 17/122 606/158 |
| 4,536,924 | A | * | 8/1985 | Willoughby | A44B 99/00 24/487 |
| 4,835,824 | A | * | 6/1989 | Durham | A61B 17/12 24/339 |
| 5,022,126 | A | * | 6/1991 | Davis | A61B 50/20 24/346 |
| 5,027,480 | A | * | 7/1991 | Hogarth | A41F 1/00 24/487 |
| 5,159,730 | A | * | 11/1992 | Radvin | A44B 99/00 24/543 |

(Continued)

Primary Examiner — Robert J Sandy
Assistant Examiner — Rowland Do
(74) Attorney, Agent, or Firm — Tucker Ellis LLP

(57) ABSTRACT

Provided is a clamp for clamping to sheet material, such as tarps. The clamp includes first and second clamping members each having a gripping portion that clamp the sheet material between one another in a clamped position. The first and second clamping members are held in the clamped position by an interaction between radial locking teeth on a deflectable release lever of one of the clamp members and a tooth in a slot of the other clamping member.

20 Claims, 6 Drawing Sheets

(56) References Cited

U.S. PATENT DOCUMENTS

| | | | |
|---|---|---|---|
| 5,313,721 A * | 5/1994 | Filden | A44C 3/001 |
| | | | 24/458 |
| 5,388,313 A | 2/1995 | Cameron | |
| 5,640,742 A * | 6/1997 | White | A44C 3/001 |
| | | | 24/18 |
| 6,698,071 B1 | 3/2004 | Greer, Jr. | |
| 6,789,295 B1 | 9/2004 | Svensson | |
| 7,152,284 B1 | 12/2006 | Greer, Jr. | |
| D543,896 S | 6/2007 | Gunnarsson | |
| 7,243,402 B2 | 7/2007 | Andersen et al. | |
| 7,308,739 B2 | 12/2007 | Andersen et al. | |
| 7,422,509 B2 | 9/2008 | Fildan et al. | |
| 7,996,963 B2 | 8/2011 | Cameron | |
| 8,167,252 B2 * | 5/2012 | Nitsche | A61B 5/04085 |
| | | | 224/194 |
| D670,998 S | 11/2012 | Lavoie et al. | |
| 8,336,173 B2 | 12/2012 | Pontaoe et al. | |
| 8,336,843 B2 | 12/2012 | Gulbrandsen et al. | |
| 8,424,170 B2 * | 4/2013 | Reznar | F16B 5/065 |
| | | | 24/297 |
| 8,991,448 B2 | 3/2015 | White | |
| 8,997,315 B2 | 4/2015 | Lebeau | |
| 9,499,318 B2 * | 11/2016 | Christensen | B65D 67/02 |
| 2011/0210215 A1 * | 9/2011 | Nitsche | A61B 5/04085 |
| | | | 248/74.1 |
| 2014/0373316 A1 | 12/2014 | Wilson et al. | |
| 2014/0373318 A1 | 12/2014 | Wilson et al. | |

* cited by examiner

SHEET MATERIAL CLAMP

FIELD OF INVENTION

The present invention relates generally to sheet gripping devices, and more particularly to a hinged device for gripping a sheet material.

BACKGROUND

A cloth, piece of plastic, or other sheet material may be used to protect items from the elements during storage or transport, such as being tied down over the items. The materials typically may have grommets or the like permanently embedded or affixed to the materials for securing the materials into place around the items to be protected. During use, the grommets may be damaged or torn out of the material as the material ages, is weathered, or is stressed under excessive force. Alternatively, materials may be used that lack embedded grommets but which may still benefit from the ability to be secured to or around the items to be protected. To allow for damaged sheet materials or materials lacking embedded grommets to be used to protect items, a clip may be provided for gripping the material.

SUMMARY OF INVENTION

The present application provides a clamp for clamping to sheet material, such as tarps. The clamp includes first and second clamping members each having a gripping portion that clamp the sheet material between one another in a clamped position. The first and second clamping members are held in the clamped position by an interaction between radial locking teeth on a deflectable release lever of one of the clamp members and a tooth in a slot of the other clamping member.

According to one aspect, a clamp for clamping sheet material is provided, the clamp including a first clamp member having a surface, a gripping portion on the surface, and a deflectable release lever extending substantially perpendicular from the surface and having a plurality of radial locking teeth, and a second clamp member connectable to the first clamp member, the second clamp member having a surface, a gripping portion on the surface facing the gripping portion on the surface of the first clamp member, and a slot extending through the second clamp member, wherein the slot is configured to receive the deflectable release lever and includes a tooth that engages the radial locking teeth of the deflectable release lever to hold the clamp members in a closed position.

The gripping portions of the first and second clamp member are movable towards one another in a first direction from an open position to the closed position to clamp the sheet material therebetween.

The deflectable release lever is deflectable away from the tooth of the slot in a second direction substantially perpendicular to the first direction to allow the clamp members to be separated.

The slot is movable along the release lever teeth to vary the gripping pressure between the first and second clamp members.

The second clamp member includes a flexible portion on which the tarp gripping portion is disposed to apply a biasing force on the gripping portions.

One of the first and second clamp members includes a swivel joint and the other includes a hinge receptacle configured to receive the swivel joint.

The swivel joint and hinge receptacle are configured to allow a relative opening and closing motion between the first clamp member and the second clamp member when the swivel joint and hinge receptacle are engaged.

The second clamp member includes a utility loop configured to receive a securing device.

The deflectable release lever is curved.

The gripping portion of the second clamp member further includes a hook-shaped portion arranged such that a curve of the hook-shaped portion connects to a flat lower portion of the gripping portion that includes a plurality of teeth for engaging teeth on the gripping portion of the first clamp member.

The hook-shaped portion of the second clamp member is configured to apply a biasing force against pressure exerted by engagement of the first clamp member and the second clamp member.

The release lever and slot are configured to allow the radial locking teeth to disengage the tooth of the slot when a minimum critical level of force is applied to the release lever in a radial direction away from the tooth allowing a relative opening between the first clamp member and the second clamp member.

The first and second gripping portions each include a plurality of teeth.

According to another aspect, a clamp apparatus for sheet materials is provided that includes a first clamp member including first and second ends, a tarp gripping portion at the first end of the first clamp member having a plurality of gripping teeth on a top surface thereof, and a release lever extending from the top surface of the first clamp member in a plane normal to the first clamp member and having a plurality of radial locking teeth positioned on one side of the release lever, and a second clamp member including first and second ends, a tarp gripping portion at the first end of the second clamp member having a plurality of gripping teeth, and a release lever slot extending through the second clamp member configured to receive the release lever and having at least one tooth configured to engage the radial locking teeth of the release lever wherein the slot is movable from one radial locking tooth to another to vary gripping pressure between the first and second clamp members.

The first clamp member further includes a swivel joint at the second end and the second clamp member further includes a hinge receptacle at the second end configured to receive the swivel joint of the first clamp member.

The second clamp member further includes a utility loop at the second end of the second clamp member configured to receive a securing device for securing sheet material.

The gripping portions of the first and second clamp member are movable towards one another in a first direction from an open position to the closed position to clamp the sheet material therebetween, and movable away from one another in a second direction opposite the first direction from the closed position to the open position.

The release lever is deflectable away from the tooth of the release lever slot in a third direction substantially perpendicular to the first and second directions to allow the clamp members to be separated and to vary a clamping distance between the first and second clamp members.

The second clamp member includes a flexible portion at the first end on which the tarp gripping portion is disposed to apply a biasing force on the gripping portions.

According to a further aspect, a clamp apparatus for sheet materials is provided that includes a first clamp member including a second end and a first end, a tarp gripping portion at the first end of the first clamp member having a plurality of gripping teeth extending from a surface of the tarp gripping portion in a first direction, a swivel joint at the second end of the first clamp member, and a release lever extending from the top surface in the first direction and having a plurality of radial locking teeth positioned on one side thereof, and a second clamp member including a second end and a first end, a tarp gripping portion at the first end of the second clamp member having a plurality of gripping teeth extending from a surface of the tarp gripping portion in a second direction opposite the first direction, a release lever slot extending through the second clamp member operable to receive the release lever of the first clamp member, the slot having at least one tooth operable to engage the radial locking teeth of the release lever, a hinge receptacle at the second end of the second clamp member operable to receive the swivel joint of the first clamp member, and an attachment member at the second end of the second clamp member operable to receive a securing device for securing sheet material.

The foregoing and other features of the application are described below with reference to the drawings.

DETAILED DESCRIPTION

The present application has particular application to a clamp or clip for clamping sheet material, such as a tarp, and thus will be described below chiefly in this context. It will of course be appreciated that principles of the application may be applicable to other clamping devices for clamping other suitable materials.

Figure 1:
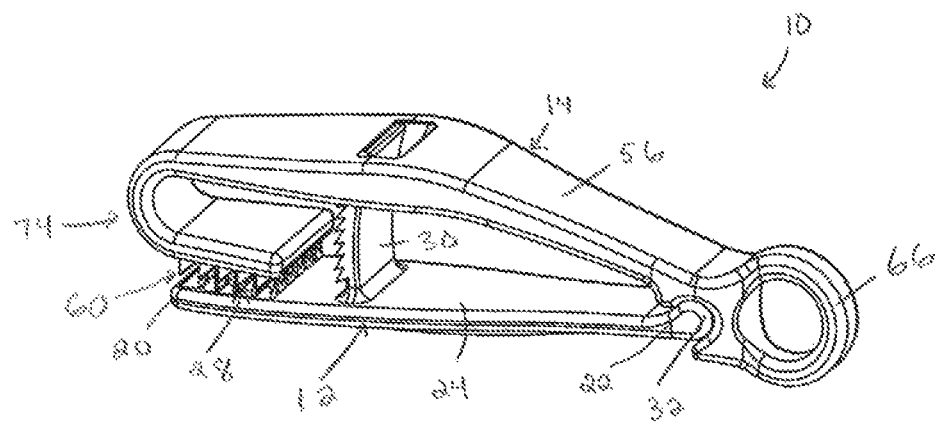
FIG. 1 is a perspective view of a representative embodiment of a clamp.
Figure 2:
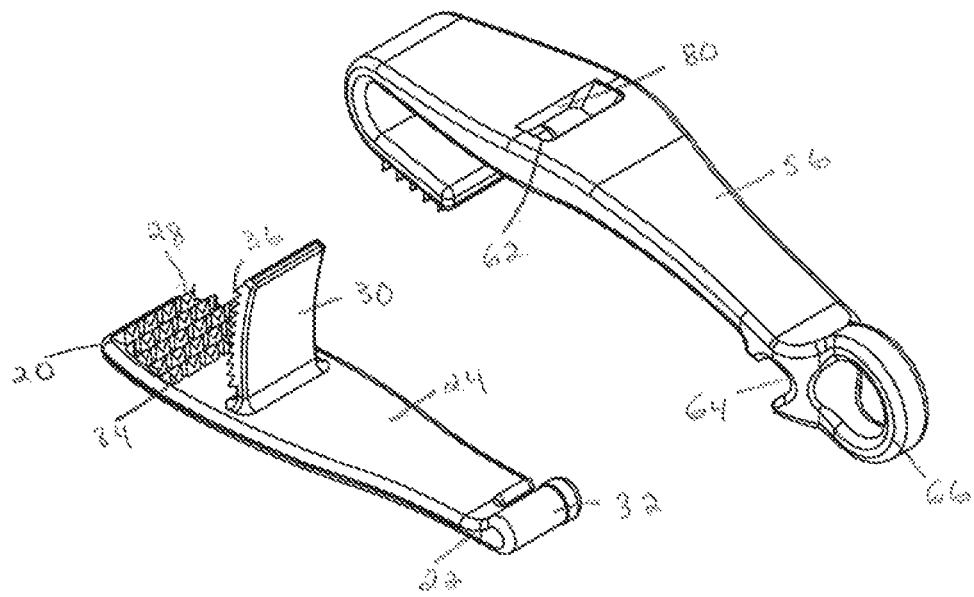
FIG. 2 is a perspective view of a first clamp member and a second clamp member of the clamp separated from one another.

Turning now to FIGS. 1 and 2, a clamp is shown generally at reference numeral 10. The clamp is configured to clamp to a sheet material and be connected to a securing device, such as a rope, bungee cord, hook, etc., to hold the sheet material in place. The clamp 10 includes a first clamp member 12 and a second clamp member 14 connectable to the first clamp member 12. The clamp members 12 and 14 are adjustable between various clamping positions to increase/decrease gripping pressure on the sheet material and to grip sheet material of various thicknesses.

Figure 3:
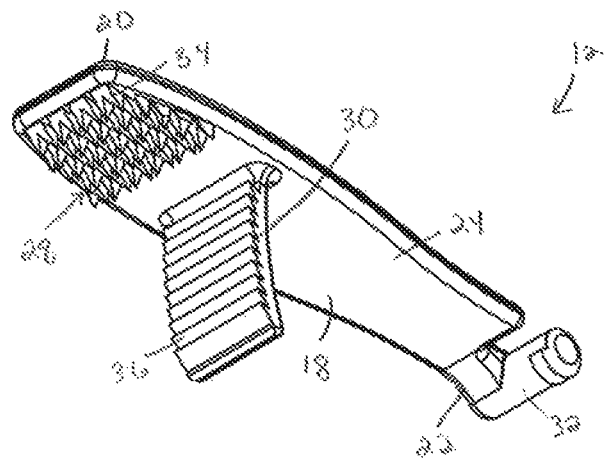
FIG. 3 is a perspective view of the first clamp member.
Figure 4:
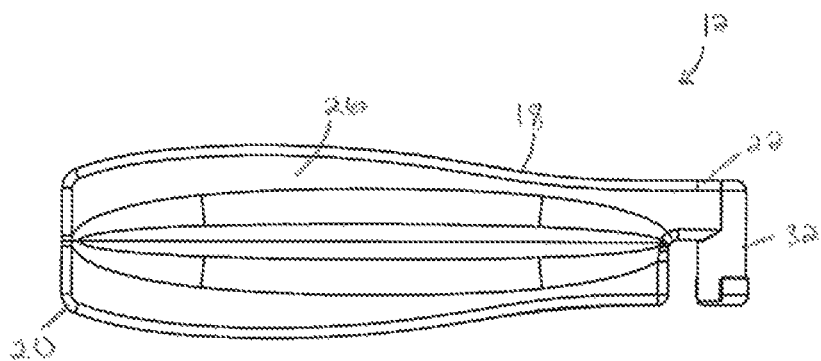
FIG. 4 is a bottom view of the first clamp member.
Figure 5:
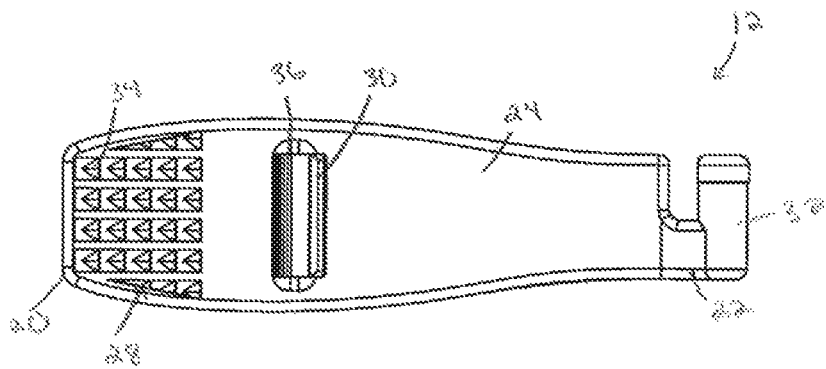
FIG. 5 is a top view of the first clamp member.

Referring additionally to FIGS. 3-5, the first clamp member 12 may be any suitable shape, such as substantially paddle shaped. The first clamp member 12 has first and second ends 20 and 22, a body 18 with top and bottom surfaces 24 and 26, a gripping portion 28 on the top surface at the first end 20, a deflectable release lever 30 extending substantially perpendicular from the top surface 24, and a swivel joint 32 at the second end 22. The gripping portion 28, deflectable release lever 30, and swivel joint 32 may be integrally formed with the body 18 or may be secured to the body in any suitable manner. The bottom surface 24 may be curved as shown to strengthen the first clamp member 12 and to reduce flexing of the first clamp member.

The gripping portion 28 includes a plurality of teeth 34 or other gripping surface spaced apart from one another. In the illustrated embodiment, the plurality of teeth 34 are provided in each of a plurality of columns that are spaced apart from one another. The teeth 34 may be substantially triangular shaped and may have a v-shaped notch to define a pair of points.

The deflectable release lever 30 includes a plurality of radial locking teeth 36 spaced along a length of the lever 30. In the illustrated embodiment, the radial locking teeth 36 face the gripping portion 28 and extend along a width of the release lever 30. The deflectable release lever 30 may be curved away from the gripping portion 28 towards the second end 22. The deflectable release lever 30 is resilient such that it is deflectable from its normal state shown in FIG. 3 towards the second end 22 of the clamp member 12 when a force is applied to the release lever 30, and the release lever 30 returns to the normal state when the force is removed.

The swivel joint 32 is substantially cylindrical in shape and extends perpendicular to the deflectable release lever 30 along a width of the body 18 of the clamp member 12. A first end of the swivel joint 32 is integrally formed with the body 18 at the second end 22 and a second end of the swivel joint 32 is axially spaced from the body 18 forming a gap between the second end of the swivel joint 32 and the body 18. The gap provides a space for a portion of the second clamp member 14 when the clamp members are moved relative to one another. The second end of the swivel joint has a larger diameter than the first end over a portion of the second end or over the entire circumference of the second end.

Figure 6:
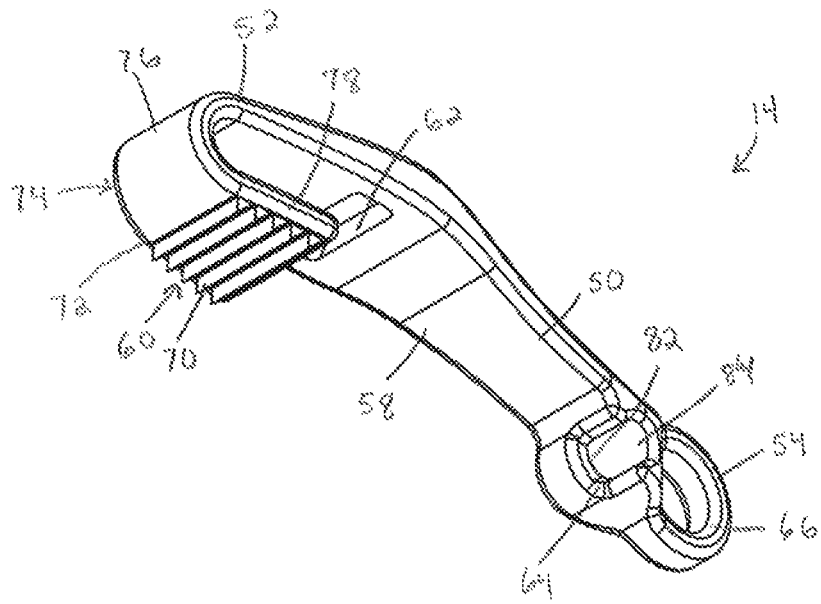
FIG. 6 is a perspective view of the second clamp member.
Figure 7:
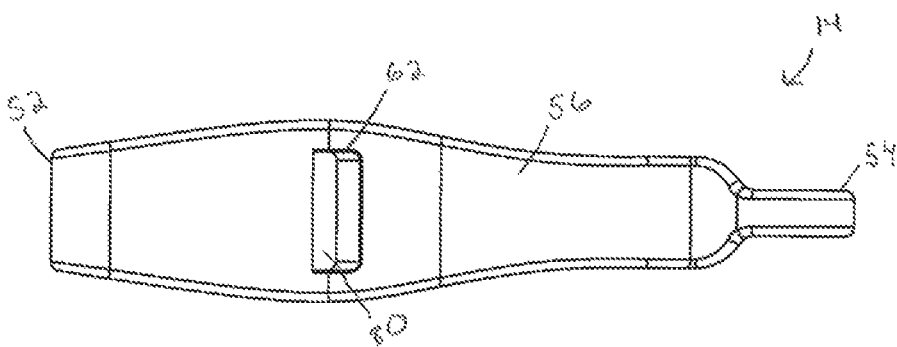
FIG. 7 is a top view of the second clamp member.
Figure 8:
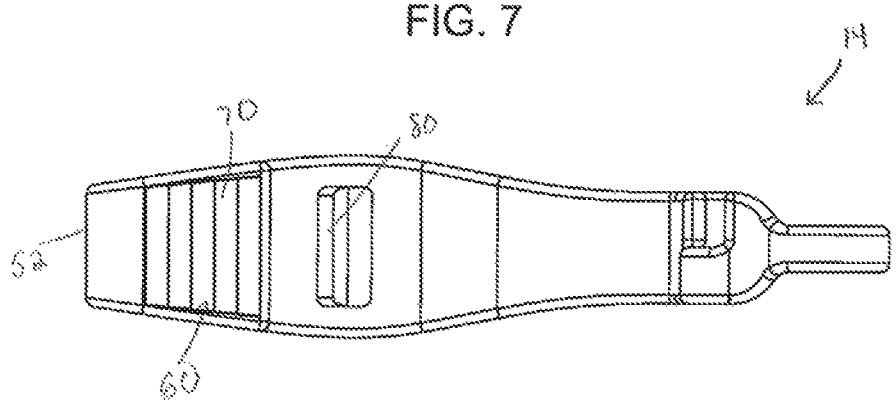
FIG. 8 is a bottom view of the second clamp member.
Figures 9, 10:
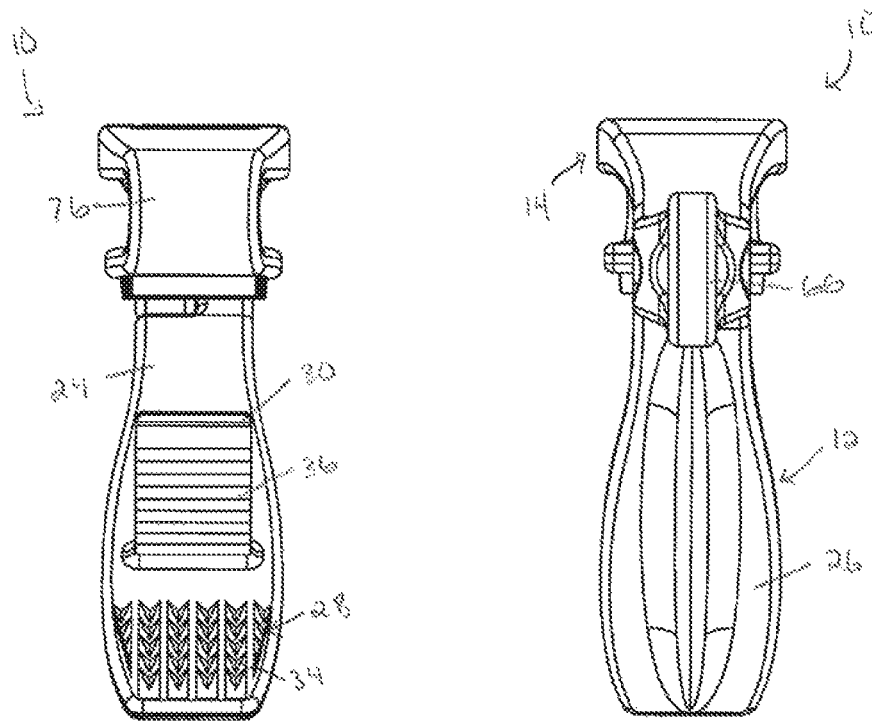
FIG. 9 is a front view of the clamp in an open position.
FIG. 10 is a rear view of the clamp in an open position.
Figure 11:
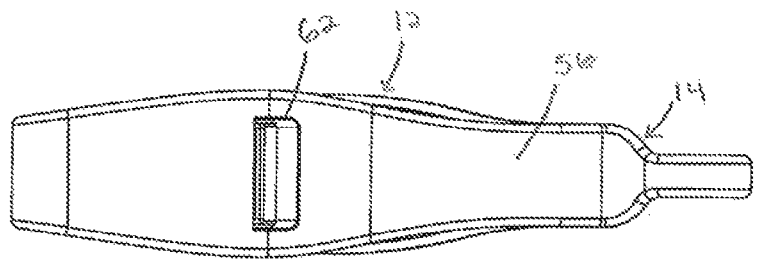
FIG. 11 is a top view of the clamp in an open position.
Figure 12:
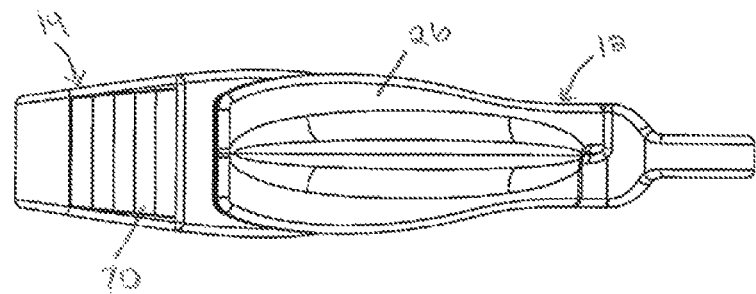
FIG. 12 is a bottom view of the clamp in an open position.
Figure 13:
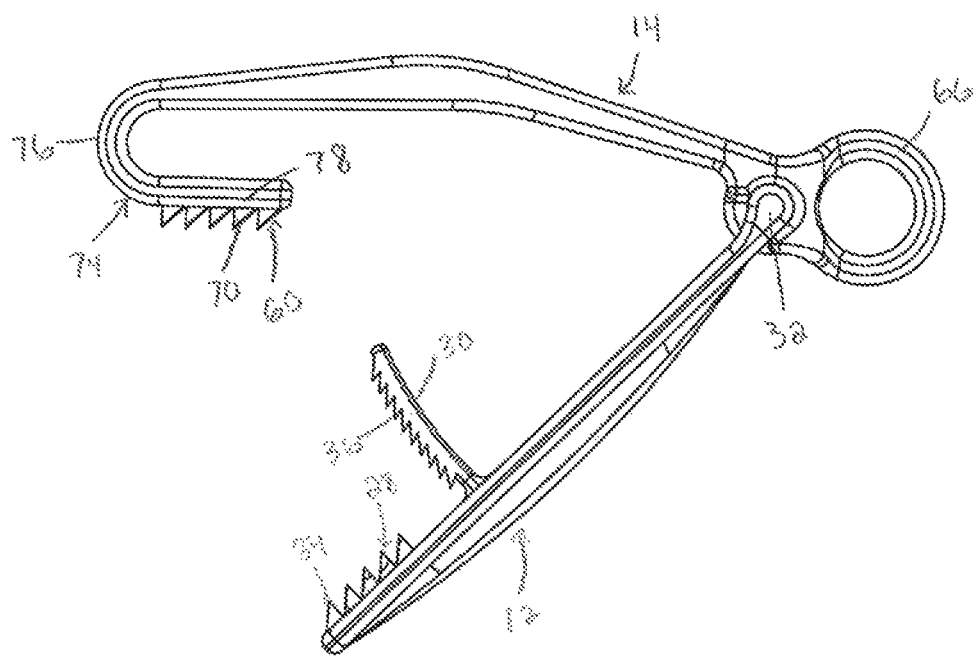
FIG. 13 is a side view of the clamp in the open position.
Figure 14:
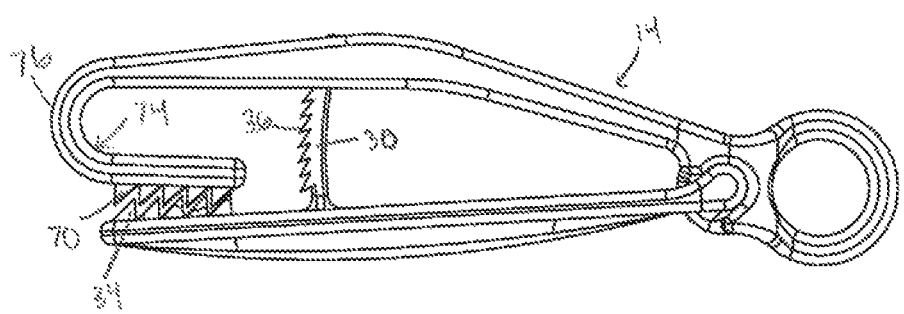
FIG. 14 is a side view of the clamp in the closed position.
Figures 15, 16:
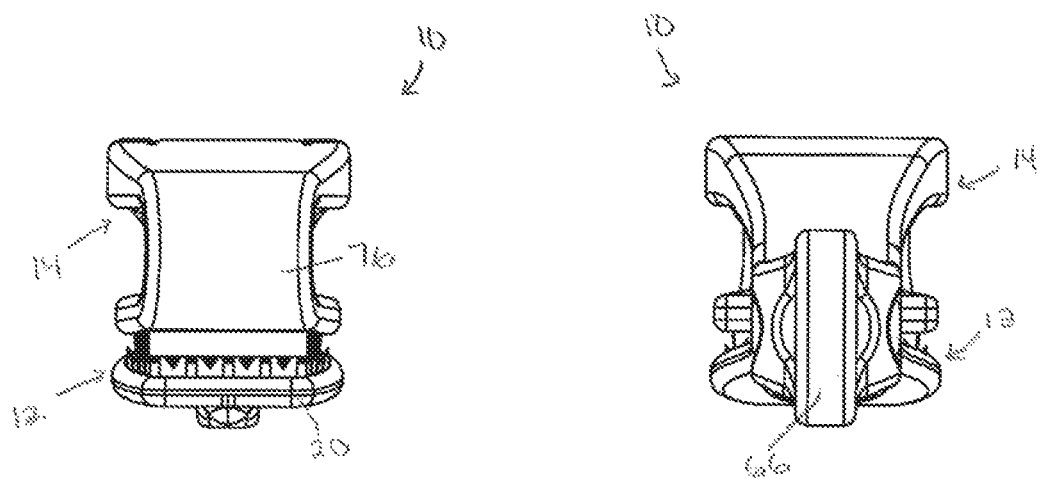
FIG. 15 is a front view of the clamp in a closed position.
FIG. 16 is a rear view of the clamp in a closed position.
Figure 17:
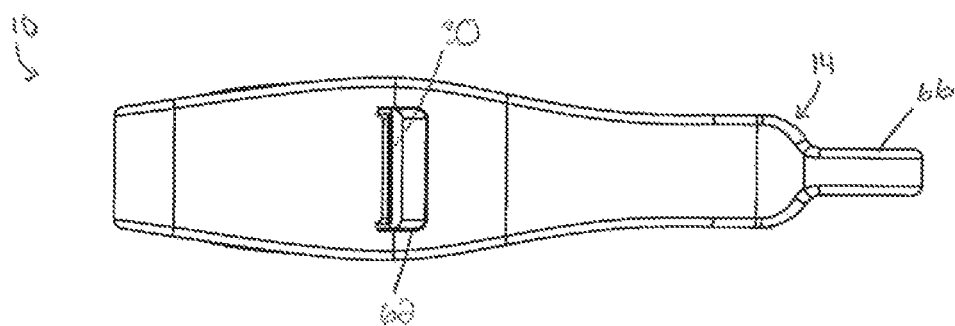
FIG. 17 is a top view of the clamp in a closed position.
Figure 18:
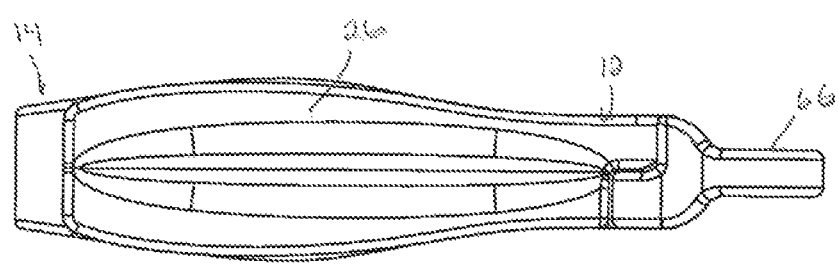
FIG. 18 is a bottom view of the clamp in a closed position.

Referring now to FIGS. 6-8, the second clamp member 14 may be any suitable shape, such as substantially paddle shaped. The second clamp member 14 has first and second ends 52 and 54, a body 50 with top and bottom surfaces 56 and 58, a gripping portion 60, a slot 62 extending through the clamp member 14, a hinge receptacle 64 near the second end 54, and an attachment member 66 at the second end 54 adjacent the hinge receptacle 64 for receiving a securing device, such as a hook. The gripping portion 60, hinge receptacle 64 and attachment member 66 may be integrally formed with the body 50 or may be secured to the body in any suitable manner. The attachment member 66 may be any suitable attachment member, such as a utility loop as shown, a hook, etc.

The gripping portion 60 includes a plurality of teeth 70 spaced apart from one another. In the illustrated embodiment, the plurality of teeth 70 extend in rows along a width of the body 50 and are substantially pyramidal in shape. The gripping portion 60 is provided on a bottom surface 72 of a flexible portion 74 of the second clamp member 14 that extends from the first end 52 of the second clamp member 14 to apply a biasing force on the gripping portions. The flexible portion 74 may be integrally formed with the body 50 or secured to the body in any suitable manner. In the illustrated embodiment, the flexible portion 74 is hook-shaped having a curved portion 76 extending from the first end 52 of the clamp member 14 and a flat portion 78 extending towards the second end 54 of the clamp member 14 such that the second clamp member 14 is substantially j-shaped. The plurality of teeth 70 of the gripping portion 60 are provided on the bottom surface 72 of the flat portion 78 facing the teeth 34 on the top surface of the body 18 of the first clamp member 12. The flexible portion 74 is resilient such that it can be flexed from its normal state shown in FIG. 6 causing the flat portion 78 to move towards the body 50 as a force is applied to tighten the connection between the first and second clamp members 12 and 14, and the flexible portion 74 returns to the normal state when the force is removed. When in the normal state, the gripping portion 60 is not parallel to the gripping portion 28, and as the connection between the clamp members 12 and 14 is tightened, the gripping portions 28 and 60 become parallel or substantially parallel to one another to maximize gripping area.

The slot 62 is sized to receive the deflectable release lever 30 and allow the deflectable release lever 30 to deflect towards the second end 22 of the second clamp member 14 while extending through the slot 62. The slot 62 includes one or more teeth 80, and in the illustrated embodiment a single tooth configured to engage the radial locking teeth 36 of the deflectable release lever 30 to hold the clamp members 12 and 14 in a closed or clamped position.

The hinge receptacle 64 is configured to receive the swivel joint 32 and hold the swivel joint 32 in any suitable manner, such as by a snap-fit, a fastener, etc. In the illustrated embodiment, the hinge receptacle defines a cavity 82 that extends along a width of the clamp member 14 to receive the second end of the swivel joint 32. The hinge receptacle 64 has an open area 84 adjacent the cavity 82 through which the portion of the body 18 of the first clamp member 12 attached to the first end of the swivel joint 32 extends. The portion of the hinge receptacle 64 defining the cavity is sized to move in the gap between the body 18 and the swivel joint 32. The interaction between the swivel joint 32 and the hinge receptacle 64 allows the angle which the first and second clamp members 12 and 14 can be opened relative to one another to be limited to maintain the assembly in a configuration that is easy to grip and close.

When the swivel joint 32 is received in the hinge receptacle 64, a relative opening and closing motion between the first clamp member 12 and the second clamp member 14 occurs. In particular, the first clamp member 12 and the second clamp member 14 are movable towards one another in a first direction towards the closed position and away from one another in a second direction opposite the first direction towards an open or unclamped position. The clamp member 10 is shown in the open position in FIGS. 9-13 and in the closed position in FIGS. 14-18.

To clamp the sheet material between the first and second clamp members 12 and 14, the clamp members 12 and 14 are moved from the open position to the closed position. As the first and second clamp members 12 and 14 are moved towards one another to the closed position, the deflectable release lever 30 enters the slot 62 and moves through the slot 62 until the desired gripping pressure between the first and second clamp members 12 and 14 has been achieved. To accomplish this, the release lever tooth 36 at the end of the release lever 30 initially engages the tooth 80 in the slot 62, and as the release lever 30 moves through the slot 62, the slot 62 engages one release lever tooth 36 after another along the length of the release lever 30 increasing the gripping pressure until the desired pressure is achieved. When the desired gripping pressure is achieved, the gripping portions 28 and 62 of the first and second clamp members 12 and 14, and in particular the teeth 34 and 70 of the gripping portions 28 and 62, clamp the sheet material between one another. Additionally, when the desired gripping pressure is achieved, the flexible portion 74 flexes to apply a biasing force to maintain or substantially maintain a constant force between the teeth 34 and 70.

To release the sheet material, the deflectable release lever 30 is deflected away from the tooth 80 of the slot 62 towards the second ends 22 and 54 of the clamp members 12 and 14 respectively in a third direction substantially perpendicular to the first and second directions when a minimum critical level of force is applied to the release lever 30. With the radial locking teeth 34 disengaged from the tooth 80 in the slot 62, the second clamp member 14 is moved relative to the first clamp member 12 to the open position.

Although certain embodiments have been shown and described, it is understood that equivalents and modifications falling within the scope of the appended claims will occur to others who are skilled in the art upon the reading and understanding of this specification.

What is claimed is:

1. A clamp for clamping sheet material, the clamp including:
    a first clamp member having a surface, a gripping portion on the surface, and a deflectable release lever extending substantially perpendicular from the surface and having a plurality of radial locking teeth; and
    a second clamp member connectable to the first clamp member, the second clamp member having a surface with first and second ends, a flexible portion extending from the first end of the surface, a gripping portion on the flexible portion facing the gripping portion on the surface of the first clamp member, and a slot extending through the surface, wherein the flexible portion is resilient and configured to apply a biasing force on the gripping portions,
    wherein the slot is configured to receive the deflectable release lever and includes a tooth that engages the radial locking teeth of the deflectable release lever to hold the clamp members in a closed position.

2. The clamp according to claim 1, wherein the gripping portions of the first and second clamp member are movable towards one another in a first direction from an open position to the closed position to clamp the sheet material therebetween.

3. The clamp according to claim 2, wherein the deflectable release lever is deflectable away from the tooth of the slot in a second direction substantially perpendicular to the first direction to allow the clamp members to be separated.

4. The clamp according to claim 1, wherein the slot is movable along the release lever teeth to vary the gripping pressure between the first and second clamp members.

5. The clamp according to claim 1, wherein one of the first and second clamp members includes a swivel joint and the other includes a hinge receptacle configured to receive the swivel joint.

6. The clamp apparatus of claim 5, wherein the swivel joint and hinge receptacle are configured to allow a relative opening and closing motion between the first clamp member and the second clamp member when the swivel joint and hinge receptacle are engaged.

7. The clamp according to claim 1, wherein the second clamp member includes a utility loop configured to receive a securing device.

8. The clamp according to claim 1, wherein the deflectable release lever is curved.

9. The clamp according to claim 1, wherein the release lever and slot are configured to allow the radial locking teeth to disengage the tooth of the slot when a minimum critical level of force is applied to the release lever in a radial direction away from the tooth allowing a relative opening between the first clamp member and the second clamp member.

10. The clamp according to claim 1, wherein the first and second gripping portions each include a plurality of teeth.

11. The clamp according to claim 1, wherein the flexible portion includes a curved portion extending from the first end of the surface and a flat portion extending toward the second end of the surface.

12. The clamp according to claim 11, wherein the gripping portion of the second clamp member is provided on the flat portion.

13. A clamp for clamping sheet material, the clamp including:
   a first clamp member having a surface, a gripping portion on the surface, and a deflectable release lever extending substantially perpendicular from the surface and having a plurality of radial locking teeth; and
   a second clamp member connectable to the first clamp member, the second clamp member having a surface, a gripping portion on the surface facing the gripping portion on the surface of the first clamp member, and a slot extending through the second clamp member,
   wherein the slot is configured to receive the deflectable release lever and includes a tooth that engages the radial locking teeth of the deflectable release lever to hold the clamp members in a closed position, and
   wherein the gripping portion of the second clamp member further includes a hook-shaped portion arranged such that a curve of the hook-shaped portion connects to a flat lower portion of the gripping portion of the second clamp member that includes a plurality of teeth for engaging teeth on the gripping portion of the first clamp member.

14. The clamp according to claim 13, wherein the hook-shaped portion of the second clamp member is configured to apply a biasing force against pressure exerted by engagement of the first clamp member and the second clamp member.

15. A clamp for clamping sheet material, the clamp including:
   a first clamp member having a surface defining a plane, a gripping portion on the surface, a deflectable release lever extending substantially perpendicular from the surface and having a plurality of radial locking teeth, and a swivel joint extending in the plane such that first and second ends of the swivel joint extend in a direction perpendicular to the deflectable release lever, wherein the first end of the swivel joint is integrally formed with the surface at an end of the surface opposite the gripping portion and the second end of the swivel joint is axially spaced from the surface forming a gap between the second end of the swivel joint and the surface; and
   a second clamp member connectable to the first clamp member, the second clamp member having a surface, a gripping portion on the surface facing the gripping portion on the surface of the first clamp member, a slot extending through the second clamp member, and a hinge receptacle configured to receive the swivel joint,
   wherein the slot is configured to receive the deflectable release lever and includes a tooth that engages the radial locking teeth of the deflectable release lever to hold the clamp members in a closed position.

16. The clamp according to claim 15, wherein the gap provides a space for a portion of the second clamp member when the first and second clamp members are moved relative to one another.

17. The clamp according to claim 15, wherein the second end of the swivel joint has a larger diameter than the first end of the swivel joint.

18. The clamp according to claim 15, wherein a portion of the hinge receptacle defines a cavity to receive the second end of the swivel joint.

19. The clamp according to claim 18, wherein the hinge receptacle has an open area adjacent the cavity through which a portion of the surface integrally formed with the swivel joint extends.

20. The clamp according to claim 18, wherein the portion of the hinge receptacle defining the cavity is sized to move in the gap between the second end of the swivel joint and the surface.

* * * * *